US008838704B2

(12) United States Patent
Naylor et al.

(10) Patent No.: US 8,838,704 B2
(45) Date of Patent: Sep. 16, 2014

(54) SYSTEM AND PROCESS FOR TRANSMITTING ELECTRONIC MAIL USING A CONVENTIONAL FACSIMILE DEVICE

(75) Inventors: Joe G. Naylor, San Francisco, CA (US); Edward R. Prince, III, San Francisco, CA (US); Josh A. Mailman, Cupertino, CA (US)

(73) Assignee: Advanced Messaging Technologies, Inc., Los Angeles, CA (US)

( * ) Notice: Subject to any disclaimer, the term of this patent is extended or adjusted under 35 U.S.C. 154(b) by 958 days.

(21) Appl. No.: 12/550,243

(22) Filed: Aug. 28, 2009

(65) Prior Publication Data

US 2010/0002260 A1    Jan. 7, 2010

Related U.S. Application Data

(63) Continuation of application No. 11/435,415, filed on May 16, 2006, which is a continuation of application No. 10/625,867, filed on Jul. 23, 2003, now abandoned, which is a continuation of application No. 09/187,365, filed on Nov. 6, 1998, now Pat. No. 6,625,642.

(51) Int. Cl.
*G06F 15/16* (2006.01)
*H04N 1/32* (2006.01)
*H04N 1/00* (2006.01)
*H04L 12/58* (2006.01)

(52) U.S. Cl.
CPC ........ *H04N 1/00209* (2013.01); *H04L 12/5835* (2013.01); *H04N 1/32411* (2013.01); *H04N 2201/0093* (2013.01); *H04L 12/58* (2013.01); *H04N 1/00212* (2013.01); *H04L 51/066* (2013.01)
USPC .......................................... 709/206; 709/204

(58) Field of Classification Search
CPC ..... G06Q 10/107; G06Q 10/00; H04L 12/585
USPC ................. 709/206, 201–205; 358/1.15, 402; 379/100.08; 370/352, 353, 401
See application file for complete search history.

(56) References Cited

U.S. PATENT DOCUMENTS

| 4,941,170 A | 7/1990 | Herbst |
| 4,989,238 A | 1/1991 | Iggulden et al. |

(Continued)

FOREIGN PATENT DOCUMENTS

| GB | 2024561 A | 1/1980 |
| GB | 2157117 A | 10/1985 |
| JP | 06164645 | 6/1994 |

OTHER PUBLICATIONS

Final Office Action (dated Apr. 28, 2009), U.S. Appl. No. 11/435,415, filed May 16, 2006, First Named Inventor: Joe G. Naylor, (17 pages).
Non-Final Office Action (dated Sep. 6, 2000), U.S. Appl. No. 09/187,332, filed Nov. 6, 1998, First Named Inventor: Joe G. Naylor, (10 pages).

(Continued)

*Primary Examiner* — Chuong T Ho
(74) *Attorney, Agent, or Firm* — Blakely, Sokoloff, Taylor & Zafman LLP

(57) ABSTRACT

This invention relates to a system for combining an electronic mail (email) address or addresses and/or facsimile telephone numbers into a fax message, so that when received by a server the fax document is processed and transmitted as an email attachment to the email addresses or a fax message to the telephone numbers of the intended fax recipients. This allows the user to be able to send faxes and emails from a conventional fax machine or personal computer without having an Internet connection.

12 Claims, 9 Drawing Sheets

(56) References Cited

U.S. PATENT DOCUMENTS

| | | | |
|---|---|---|---|
| 4,994,926 A | | 2/1991 | Gordon et al. |
| 5,115,326 A | | 5/1992 | Burgess et al. |
| 5,193,110 A | | 3/1993 | Jones et al. |
| 5,247,591 A | | 9/1993 | Baran |
| 5,253,341 A | | 10/1993 | Rozmanith et al. |
| 5,333,266 A | | 7/1994 | Boaz et al. |
| 5,339,156 A | | 8/1994 | Ishii |
| 5,406,557 A | | 4/1995 | Baudoin |
| 5,461,488 A | | 10/1995 | Witek |
| 5,479,411 A | | 12/1995 | Klein |
| 5,499,108 A | | 3/1996 | Cotte et al. |
| 5,517,324 A | | 5/1996 | Fite, Jr. et al. |
| 5,521,719 A | | 5/1996 | Yamada |
| 5,561,703 A | | 10/1996 | Arledge et al. |
| 5,568,536 A | | 10/1996 | Tiller et al. |
| 5,568,540 A | | 10/1996 | Greco et al. |
| 5,579,472 A | | 11/1996 | Keyworth, II et al. |
| 5,608,786 A | | 3/1997 | Gordon |
| 5,675,507 A | | 10/1997 | Bobo, II |
| 5,765,033 A | | 6/1998 | Miloslavsky |
| 5,790,790 A | * | 8/1998 | Smith et al. ............. 709/206 |
| 5,805,298 A | | 9/1998 | Ho et al. |
| 5,812,278 A | | 9/1998 | Toyoda et al. |
| 5,838,685 A | | 11/1998 | Hochman |
| 5,859,967 A | | 1/1999 | Kaufeld et al. |
| 5,870,089 A | | 2/1999 | Fabbio et al. |
| 5,974,449 A | * | 10/1999 | Chang et al. ............. 709/206 |
| 5,978,477 A | | 11/1999 | Hull et al. |
| 6,020,980 A | | 2/2000 | Freeman |
| 6,025,931 A | | 2/2000 | Bloomfield |
| 6,028,679 A | | 2/2000 | Murphy |
| 6,061,502 A | | 5/2000 | Ho et al. |
| 6,101,244 A | | 8/2000 | Okada |
| 6,104,500 A | | 8/2000 | Alam et al. |
| 6,108,099 A | | 8/2000 | Ohtani |
| 6,124,939 A | | 9/2000 | Toyoda et al. |
| 6,157,706 A | * | 12/2000 | Rachelson ............. 379/100.08 |
| 6,208,638 B1 | | 3/2001 | Rieley et al. |
| 6,211,972 B1 | * | 4/2001 | Okutomi et al. ............. 358/402 |
| 6,259,533 B1 | | 7/2001 | Toyoda et al. |
| 6,266,160 B1 | | 7/2001 | Saito et al. |
| 6,350,066 B1 | | 2/2002 | Bobo, II |
| 6,356,356 B1 | | 3/2002 | Miller, Jr. et al. |
| 6,396,597 B1 | | 5/2002 | Marshall |
| 6,424,426 B1 | | 7/2002 | Henry |
| 6,564,321 B2 | | 5/2003 | Bobo, II |
| 6,597,688 B2 | | 7/2003 | Narasimhan et al. |
| 6,611,291 B1 | | 8/2003 | Dow et al. |
| 6,684,368 B1 | | 1/2004 | Hull et al. |
| 6,707,580 B1 | * | 3/2004 | Bloomfield ............. 358/402 |
| 6,771,381 B1 | | 8/2004 | Klein |
| 7,804,823 B2 | | 9/2010 | Toscano et al. |
| 2001/0015819 A1 | | 8/2001 | Toyoda et al. |
| 2003/0067662 A1 | | 4/2003 | Brewer et al. |
| 2004/0100648 A1 | | 5/2004 | Kulakowski |

OTHER PUBLICATIONS

Non-Final Office Action (dated May 7, 2001), U.S. Appl. No. 09/187,332, filed Nov. 6, 1998, First Named Inventor: Joe G. Naylor, (10 pages).

Final Office Action (dated Nov. 5, 2001), U.S. Appl. No. 09/187,332, filed Nov. 6, 1998, First Named Inventor: Joe G. Naylor, (12 pages).

Non-Final Office Action (dated Apr. 23, 2002), U.S. Appl. No. 09/187,332, filed Nov. 6, 1998, First Named Inventor: Joe G. Naylor, (10 pages).

Final Office Action (dated Oct. 20, 2003), U.S. Appl. No. 09/187,332, filed Nov. 6, 1998, First Named Inventor: Joe G. Naylor, (6 pages).

Examiner's Answer (dated Jun. 16, 2004), U.S. Appl. No. 09/187,332, filed Nov. 6, 1998, First Named Inventor: Joe G. Naylor, (9 pages).

Decision on Appeal (dated Apr. 28, 2006), U.S. Appl. No. 09/187,332, filed Nov. 6, 1998, First Named Inventor: Joe G. Naylor, (11 pages.

"The Cutting Edge/Personal Technology; All-in-One Devices Improve", [Home Edition], Los Angeles Times, Los Angeles, CA, USA, Aug. 14, 2009, Internet article at: http://pqasb.pqarchiver.com/latimes/access/28793310.html?did . . . , (2 pages).

Non-Final Office Action (dated Jan. 25, 2005), U.S. Appl. No. 10/625,867, filed Jul. 23, 2003, First Named Invention: Joe G. Naylor, (15 pages).

Final Office Action (dated Aug. 10, 2005), U.S. Appl. No. 10/625,867, filed Jul. 23, 2003, First Named Invention: Joe G. Naylor, (13 pages).

Non-Final Office Action (dated Sep. 28, 2007), U.S. Appl. No. 11/435,415, filed May 16, 2006, First Named Inventor: Joe G. Naylor, (16 pages).

"Unified Messaging Solutions on the Road", Mar. 7, 1995, Computer Telephony Expo, Dallas, Texas.

Tomaru, "Electronic Mail Systems", 1983, Japan Annual Review in Electronics, Computers and Telecommunications, vol. 9, Telecommunications Technology, (pp. 283-290).

Final Office Action (dated Jul. 17, 2012), U.S. Appl. No. 11/435,415, filed May 16, 2006, First Named Inventor: Joe G. Naylor, 20 pages.

Final Office Action (dated Oct. 14, 2010), U.S. Appl. No. 11/435,415, filed May 16, 2006, First Named Inventor: Joe G. Naylor, (14 pages).

Non-Final Office Action (dated Jan. 6, 2012), U.S. Appl. No. 09/187,332, filed Nov. 6, 1998, First Named Inventor: Joe G. Naylor, 14 pages.

Non-Final Office Action (dated Apr. 29, 2010), U.S. Appl. No. 11/435,415, filed May 16, 2006, First Named Inventor: Joe G. Naylor, (11 pages).

Non-Final Office Action (dated May 24, 2011), U.S. Appl. No. 11/435,415, filed May 16, 2006, First Named Inventor: Joe G. Naylor, (14 pages).

Non-Final Office Action (dated Sep. 16, 2009), U.S. Appl. No. 11/435,415, filed May 16, 2006, First Named Inventor: Joe G. Naylor, (22 pages).

* cited by examiner

SYSTEM AND PROCESS FOR TRANSMITTING ELECTRONIC MAIL USING A CONVENTIONAL FACSIMILE DEVICE

This application is a continuation of Ser. No. 11/435,415, filed on May 16, 2006, entitled "System and Process for Transmitting Electronic Mail Using a Conventional Facsimile Device, which is a continuation of application Ser. No. 10/625,867, filed on Jul. 23, 2003, which is a continuation of application Ser. No. 09/187,365, filed on Nov. 6, 1998 (which issued as U.S. Pat. No. 6,625,642, on Sep. 23, 2003).

BACKGROUND OF THE INVENTION

1. Technical Field

This invention relates to a system for combining electronic mail (email) addresses and/or facsimile telephone numbers into a fax message, so that when received by a server the fax document is processed and transmitted as an email to the email addresses or as a fax to the telephone numbers of the intended fax recipients, or both. This allows the user to send faxes and emails from a conventional fax machine without necessarily having a computer, local area network (LAN) or Internet connection on site.

2. Background Art

Facsimile (fax) devices are popular mechanisms for the transmission of text and graphics. They are relatively easy to use and inexpensive to purchase, and transmission by fax machine is fast and cost effective. In addition, fax machines can transmit over ordinary telephone lines without the need for any special service. Moreover, the paper input and output of most fax machines appeals to those who prefer paper copies of documents and are not comfortable with transmitting and receiving information by way of computer.

For those more comfortable with computers, electronic mail (email) is an even more expedient and cost effective way of transmitting information. Documents which are created using a computer, or otherwise imported, can be transmitted, received and reviewed without generation of a paper copy if compatible viewing software is available. The increasing use of wide area networks (WANS) such as the Internet, makes email even more useful by allowing simultaneous transmission of data to a much wider group of recipients. However, unlike facsimile machines that can send faxes directly over the telephone lines, an email user must generally pay for an Internet service provider to provide an email mail box and email capability, or invest in expensive computer equipment and server software to create a comparable on-site capability.

Traditionally, facsimile devices and electronic mail devices have for the most part been thought of as separate, with facsimile type communication being performed by a specialized fax machine and email communications being performed by a general purpose desktop computer equipped with a modem and/or a connection to the Internet. However computers, when configured appropriately with a fax/data modem which receives and transmits in accordance with both facsimile and data communications protocols, can transmit and receive documents in accordance with a fax or email protocol. The faxes can be sent from the computer over the telephone lines without an Internet connection, however such a connection is still required to send emails. Recently, it has even been proposed to send emails via a facsimile machine. But, again, an Internet connection is required.

Fax machines have also been used to send encrypted data. However, to send an encrypted fax to a recipient, both the sender and recipient have needed specialized fax machines employing special encryption methods. These fax machines have been prohibitively expensive and very slow in transferring data. Sending encrypted email via a computer has also been difficult in the past. Typically, both the sending computer and the receiving computer must have compatible, specialized software in order to encrypt and decipher the email.

Thus, there is a need for an improved system and process that allows a user to send faxes and emails, or both, from a fax machine or a personal computer, without the need for a LAN or an Internet connection on site. Additionally, this improved system should allow the sender to send either faxes or emails, or both, to one or several recipients. This system would allow the same message to be sent to various recipients whether or not they have fax and email capabilities, as long as they have one or the other. Furthermore, this improved system should allow the sender to send messages in a secure, encrypted format to a recipient without the need for an expensive secure fax machine or pre-existing specialized software at the receiving end. Such an improved system would provide major advancements in functionality and practicality over the present technology.

SUMMARY

The present invention overcomes the common problems and disadvantages of prior fax and electronic mail systems with a system and process that allows faxes and emails to be sent from a fax machine or computer without the need for an Internet connection. This preferred system and process includes a fax device, which can be a fax machine, or a PC equipped with a fax modem and scanner. The fax device communicates with a server which preferably consists of a PC or other computer, or a grouping of computers. The server responds to requests and commands from the transmitting fax device. Specifically, the server receives the transmission from the fax device and decodes the data to determine whether or not to forward the message as an email or fax to intended recipients.

Specifically, specialized data, which is based on data entered into the sending fax device by the user, is transferred from this fax device to the server in the fax transmission. In the preferred embodiment, the fax device should be able to support fax BFT capabilities. This capability will allow various data demarcated by tags to be entered into the message that is transmitted from the fax device to the server. Such tagged data would at a minimum include an email address or addresses. Additionally, tags could be added to include an identification code for identifying the sending fax device, fax number(s), the sender's reply email address and/or an indicator as to whether the message data is encrypted or not.

In operation, the server strips away the tags, deciphers the tagged data and forwards the message data to the appropriate fax or email recipients, or otherwise acts on the transmission based on the information contained in the tags. However, even if the sending fax device does not support BFT format, the server could employ the use of fax data transmitted in another form to implement the same scheme of extracting data from the fax transmission, deciphering it and then forwarding the appropriate emails or faxes to the intended recipient(s) or otherwise acting on the fax transmission. For example, a standard fax machine which uses headers might include the above tag data in the form of fields included in the fax header data.

A user wishing to transmit a document to the server to have it forwarded via fax or email, would place the document in the fax device scanner and enter one or more destination identifiers into the fax device keyboard or otherwise recall these identifiers from the fax device's memory. The destination identifier(s) would either take the form of a phone number, or an email address, or both, depending on where and how the sender wishes the document to go. Alternatively, the server may contain one or more memory locations containing listings of email addresses or fax telephone numbers, such as for example in the form of a mailing list. In such a case, the sending fax can elect to send emails or faxes to all recipients stored in such a server repository by providing an indicator in the fax transmission which designates the appropriate memory location for the desired listing resident in the server.

The sender could also enter other pertinent information. For example, the sender could enter information identifying the fax machine. This information is used to determine if the sender is authorized to use the server. The sender could also enter a password to invoke an encryption feature. This password tells the fax device to scramble the data to be scanned for transmission purposes. The password is not provided in the fax transmission so that even the server cannot "read" the message data. The person receiving the data would already have been given the password needed to decode the email. Still further, the sender could enter a reply email address. This reply address could be provided to the recipient of the original email transmission for use in sending email transmission (e.g. a reply) back to the sender.

The transmission process begins with the user (or sender) pressing a command button of the fax device or in some other way initiating the transmission. For example, the user could enter the telephone number of the server or select the server number from one or more preprogrammed telephone numbers previously stored in the memory of the facsimile device. The fax device scans the document constituting the message data and reads information entered/indicated by the user or stored in fax device's memory. Next the fax machine packages the user-specified and other standard formatting data as needed with the message data. The transfer process continues with the fax device initiating a handshake with the server. Once the fax device and the server have established communications, the fax device initiates a file transfer, preferably a BFT file transfer, of the data to the server. The server receives the fax transmission and then strips the user-specified information and standard fax formatting data from the fax transmission leaving only the message data. The user-specified information is then checked to ensure the sending fax device is authorized to use the server. This is accomplished by finding the appropriate tag in the transmitted data that is associated with the sending fax's identification code and then comparing this identification information to a listing of authorized users stored in a memory location in the server. If the server determines that the fax device is not authorized to use the server, it discards any received data. If, however, the fax device is authorized to use the server, the server finds the destination identifier(s) and other data resident in the fax transmission. In the case of the destination identifiers, if the server finds fax numbers, or an indicator pointing to a repository in server memory where fax telephone numbers reside, then it simply adds standard fax formatting information and faxes the message data to the specified fax numbers (or fax number if there is only one). Next, if the server finds email addresses, or an indicator pointing to a server repository where the addresses reside, it applies a standard email header and transmits the message data, preferably as a MIME encoded attachment to the header of the email transmission (or email transmissions if there is more than one email address).

If the user-specified information includes a reply email address belonging to a sender of the message data, then it can be extracted and provided to the recipient(s) of the aforementioned email transmission. The sender's reply email address can be provided by the server either including it in a "from" field of the email header or inserting it in the message data, or both.

The server can also determine whether email has ever been sent to the intended recipient before. To this end, the server stores the email addresses of all previous recipients in one of its repositories. If the server determines that it is the first time that email has ever been sent to a recipient then the server sends the appropriate viewer needed to view the message data. The server may also send the viewer along with a message telling the recipient to use this viewer if the recipient cannot open the email. Further, the server may also send a message telling the recipient that if they cannot read the email with the attached viewer to provide information about the system they are using back to the server. If the recipient sends information about their system to the server, the server first determines whether the data was encrypted. This is accomplished by finding the tag in the fax transmission that indicates whether the message data is encrypted. If the server determines that the data was encrypted, then the server sends a message to the recipient telling them to contact the original sender. If the server determines that the data was not encrypted, then it sends the message data back to the intended recipient in a format compatible with the recipient's system.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

Figure 1:
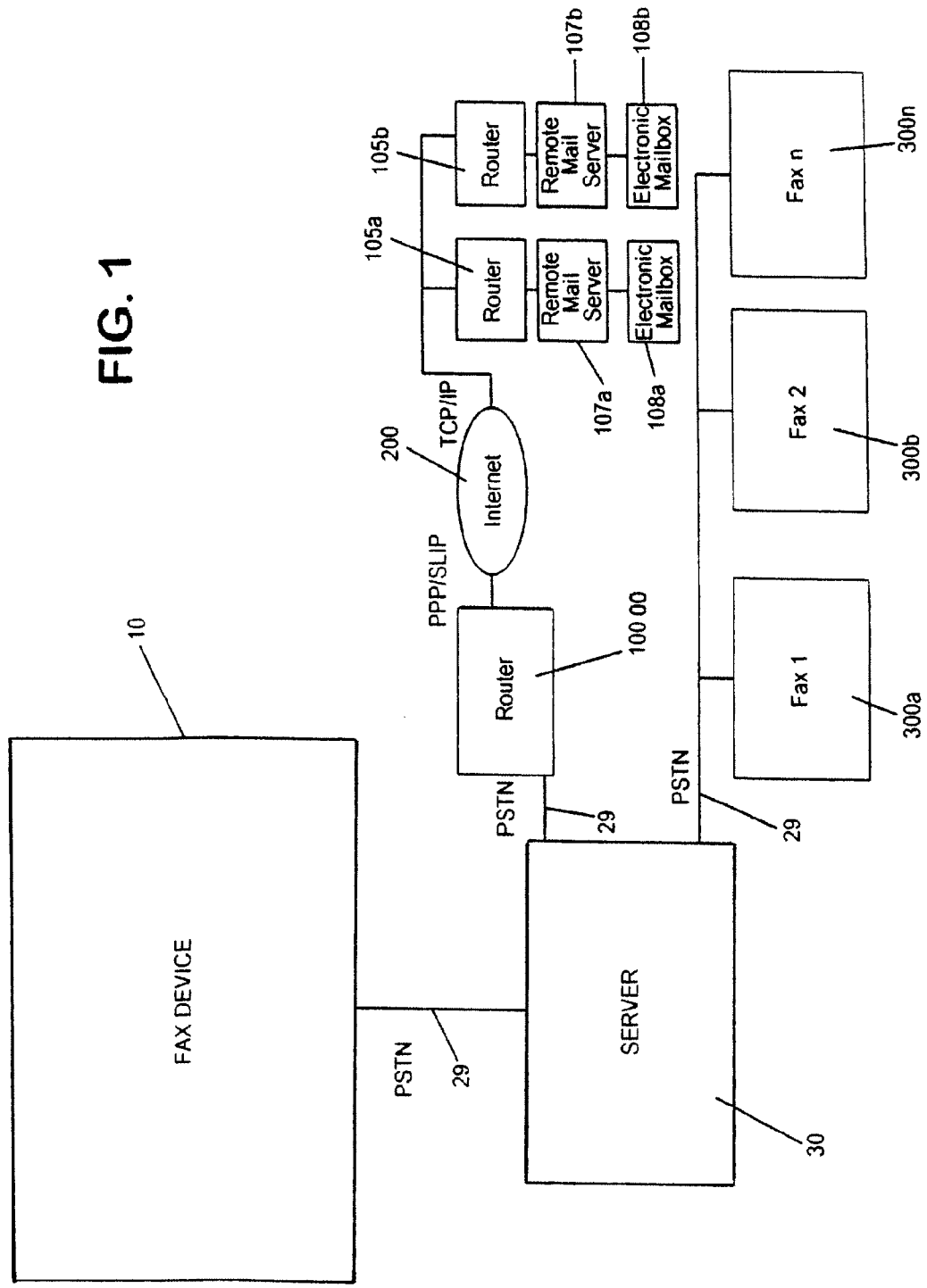
FIG. 1 is schematic illustration of a fax device coupled to communicate with remote communications devices such as a wide area network and numerous fax machines.

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

In general, facsimile or fax machines transmit text or graphics over telephone lines in digitized form. Conventional fax machines scan an original document, transmit an image of the document as a bit map, and reproduce the received image on a printer. Resolution and encoding are standardized in the Comite Consultatif Internationals de Telegraphie et Telephonie (CCITT) Groups 1-4 recommendations. Note that the CCITT is now known as the International Telephone Union Telecommunication Standardization Sector (ITU-T). Fax images can also be sent and received by computers equipped with fax modem hardware and appropriate software.

To understand the nature of the invention, it is useful to first provide a background on facsimile transmission standards. Most fax machines today communicate over the Public Switched Telephone Network (PSTN) in accordance with a facsimile communications protocol as defined by the CCITT Group 3. Group 3 is one of the four groups defining facsimile transmission standards and is designed for digital data transfer over an ordinary phone line. Within the Group 3 standard, there are various recommendations that relate to aspects of facsimile transmission. In general, the Group 3 standard supports "standard" and "fine" images, two methods of data compression, password protection and polling. The T.30 protocol associated with the Group 3 standard covers the protocol used to manage a fax session and negotiate the capabilities supported by each machine. The T.30 protocol includes five phases of facsimile transmission: A) a call set up phase that includes establishing a call between a calling and receiving device; B) a pre-call message phase that includes identifying and selecting data encoding and processing capabilities; C) a message transmission phase that includes transferring data, synchronization, error detection and correction, and line supervision; D) a post message phase that includes signaling the end of the message and confirming the message; and E) a call release phase that includes terminating the call.

Some fax machines are capable of electronically transferring binary data or files, called Fax Binary File Transfer (BFT) using the Group 3 facsimile communications products. The BFT file format is a structure which is used to hold the contents of a binary file and various attributes. This BFT format is defined in CCITT recommendation T.434 and is a method of encoding documents and sending them by fax without converting them to an image format first. In concept, the BFT file format behaves like an envelope, since the original binary data is stored along with other information during the T.434 encoding, and then all of that information, including the original file content, may be extracted after the BFT file has been transferred. As defined in T.434, the format consists of a sequence of tags and associated data. The tags are coded using a standard method for representing data known as Abstract Syntax Notation No. 1 (ASN.1). In T.434, a total of 30 tags are available to represent a binary file and its attributes. The data-file-content tag is used to identify the actual binary data and is followed by length field and the data itself. The "protocol-version" tag is used to specify which version of T.434 is being used. The remaining tags are used to encode other descriptive information about the binary file. Commonly used tags include filename, pathname, creation-date, contents-type, application-reference and user-visible-string.

BFT files are transferred using a version of the Group 3 facsimile protocol as contained in the International Telephone Union Telecommunication Standardization Sector (ITU-T) (formally CCITT) recommendation T.30. The most important of T.30 phases for Fax BFT are phases B, C and D of this protocol as discussed previously. In Phase B, the two facsimile devices conduct negotiations through an exchange of signals. Basically, the answering fax device provides a menu of possible choices for the characteristics of the fax session. The transmitting fax device chooses from the menu and issues commands on how to proceed. During this negotiation, the sending fax device also indicates the type of information which is to be transferred. If the receiving device supports Fax BFT, the transmitter may choose to initiate a binary file transfer. The T.434 encoded file is transferred in Phase C, by grouping the encoded data into blocks which contain up to 256 frames of data (64 KB). The Group 3 fax Error Correction Mode is used to ensure that all frames are received correctly. Then in Phase D, the receiver confirms whether or not all frames have been received correctly and requests a re-send of any frames in error. Once all of the frames in the block (also called partial pages) have been sent, the transmitter can return to Phase C and transmit any remaining blocks of data until the entire BFT encoded file has been sent. At this point, the session proceeds to Phase E and the phone line is disconnected to end the session.

In the case of Fax BFT file transfer, the source of the information is typically a file on a computer which is stored in digital form. Any type of file may be used as the source for a BFT fax transmission. Since the BFT file format behaves like an envelope for the data, the original file contents and various attributes of the file are preserved during the transfer. Upon receipt, the information can be decoded and the file itself may be edited, viewed, printed or otherwise manipulated, depending upon the type of file. In a business setting, a typical scenario for the use of T.434 would involve a mobile worker who has a notebook Personal Computer (PC) for sending or receiving BFT files and a departmental or enterprise fax server which can support the sending or receiving of BFT files. Thus, a mobile worker could call into a home office fax server and send or poll BFT files.

The main difference between regular fax and BFT fax is in the type of information that is being transferred and the way that the information is encoded. The traditional fax transmission has involved a transfer of fax images from one fax machine to another. In that case, text and graphics information are scanned from paper, compressed into a standard fax image format, then transferred using the T.30 fax protocol to another fax machine, where the image is printed out onto paper. Using a computer to fax is quite similar, the main difference being that a fax image file is created from a source file on a computer. In the typical case, the user prints from their application to a special fax print driver and then the results are stored in a fax image file to be transmitted. The fax is then transmitted to a destination fax device, where the information may be viewed or printed as an image file. However, the original source file is not transferred in a the case of a fax image transmission, so it may not be directly edited by programs such as word processors or spreadsheets.

Additionally, to understand the present invention some brief information on electronic mail communications is also necessary. Electronic mail communications are performed by establishing a communications link over PSTN in the form of Serial Line Internet Protocol (SLIP) or a Point to Point Protocol (PPP), collectively termed SLIP/PPP. A router is used to provide connection between two networks which both operate in accordance with the same protocol. For example, a router provides a connection to the Internet in order transmit and receive information between a communications device and the Internet. The router typically transmits and receives electronic mail messages in accordance with the Simple Mail Transfer Protocol (SMTP) utilized by the TCP/IP (Transmission Control Protocol/Internet Protocol) suite of protocols. The functions performed by a router may be performed by a commercial service which provides access to the Internet via a dial-up connection. Remote mail servers implement electronic mailboxes to receive electronic mail messages.

Figure 2A:
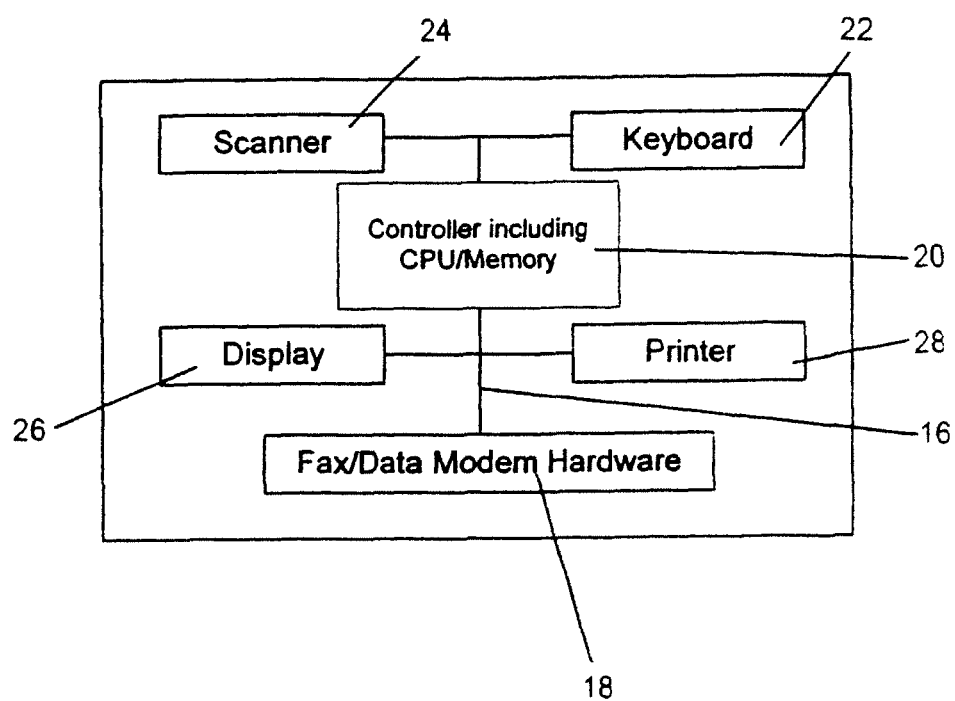
FIG. 2A is the schematic illustration of the facsimile device of FIG. 1 wherein the fax device is a facsimile machine.
Figure 2B:
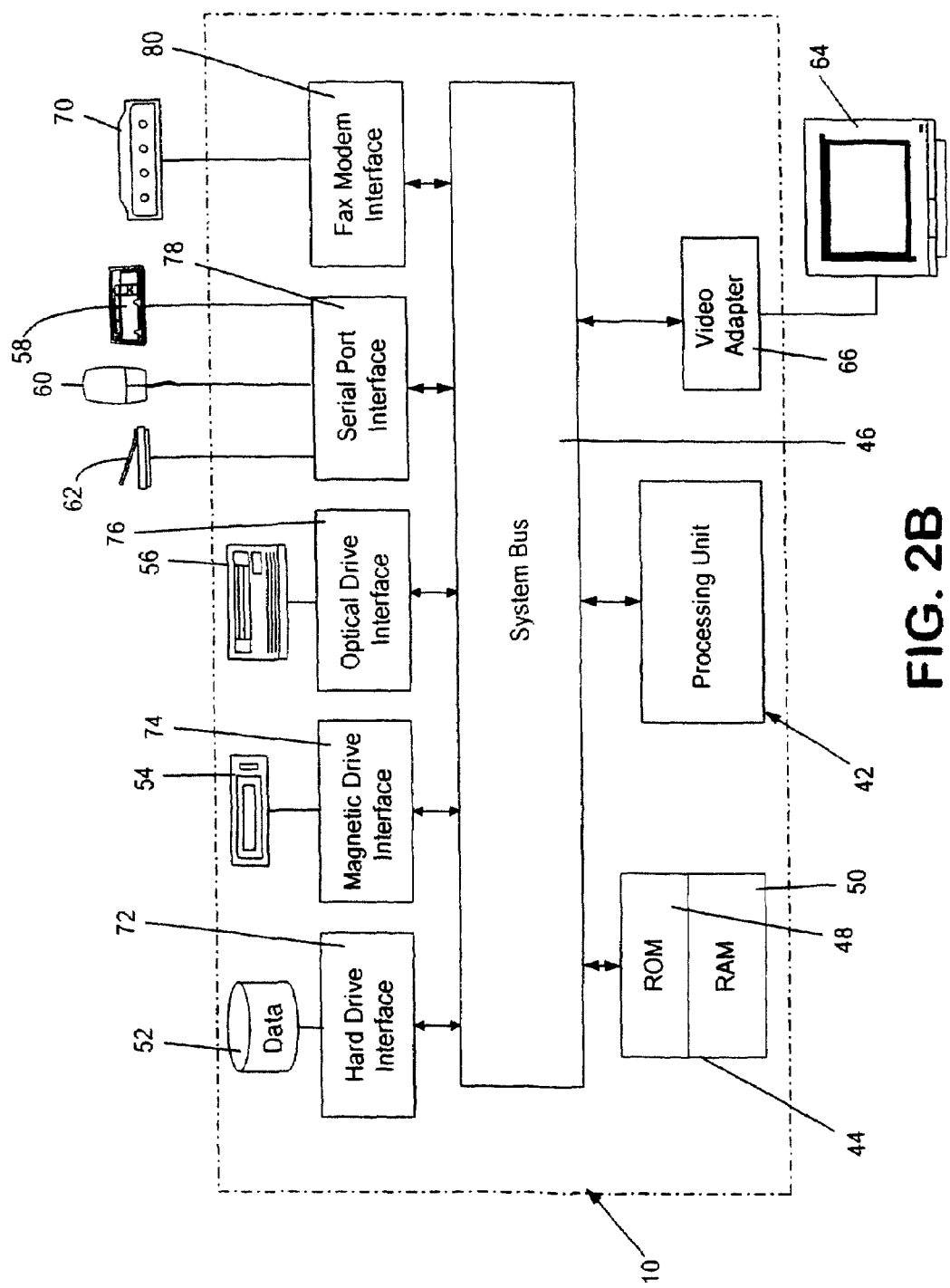
FIG. 2B shows the PC operating environment wherein the fax device of FIG. 1 is implemented in a PC with a scanner and fax modem.

FIG. 1 is a block diagram providing an overview of the preferred system according to the present invention. The system includes a fax device 10, which can be a fax machine as shown in FIG. 2A or a PC equipped with a fax modem as shown in FIG. 2B. Referring to FIG. 2A, the fax machine 10 includes a controller 20 having a central processing unit (CPU) and memory. The fax machine also has a scanner 24, keyboard 22, display 26 and printer 28. These components are coupled together through a bus 16. The bus 16 may carry data signals, control signals and power to the various components in the fax machine 10. The scanner 24 receives a document to be transmitted and generates digital data indicative of the information contained in the document. The keyboard 22 is preferably configured to allow for entry of alphabetic and numeric characters and for entry of commands to control the operation of the fax machine. For example, the keyboard 22 allows entry of destination identification information (e.g. telephone numbers or email addresses) and can initiate transmission. Any number of commercially available CPUs may be used within the invention, but the CPU should preferably be powerful enough to support the aforementioned BFT capabilities. The memory may include Random Access Memory (RAM) and Read Only Memory (ROM). The fax modem hardware 18 includes standard hardware to physically transmit and receive signals over the phone line 29. Using fax modem hardware 18, the fax machine 10 communicates with a server 30.

A fax machine would primarily implement this invention through the use of firmware. However, the invention could also be implemented using a standard personal computer (PC) with a fax/modem, CPU, RAM, other associated PC components and software for scanning and transmitting the documents in fax format.

In regards to the aforementioned implementation of the invention in a software program running on a general purpose computer system, FIG. 2B depicts a suitable computing environment for this implementation. The exemplary computer system of FIG. 2B includes a general purpose computing device in the form of a conventional personal computer 40, including a processing unit 42, a system memory 44, a system 46 that couples various system components including the system memory of the processing unit 42. The system bus 46 may be any of several types of bus structures such as described previously in connection with the firmware embodiment of the invention. The system memory includes read only memory (ROM) 48 and random access memory (RAM) 50. The personal computer 40 further includes data storage devices such as, but not limited to, a hard disk drive 52, a magnetic disk drive 54, and an optical disk drive 56. All of these drives are respectively connected to the system bus 46 via an appropriate interface 72, 74, 76 and are capable of reading from and writing to an appropriate computer-readable medium (e.g. hard disk, magnetic disk, or optical disk, respectively). The drives and their associated computer-readable media provide nonvolatile storage of computer readable instructions, data structures, program modules and other data for the personal data 40, as do the ROM 48 and RAM 50. These may include an operating system, one or more application programs, other program modules, and data.

A user may enter commands and information into the personal computer 40 through input devices such as, but not limited to a keyboard 58 and pointing device 60 (e.g. a computer mouse). These and other input devices are typically connected to the processing unit 42 through a serial port interface 62 via the bus 46. A monitor 64 is also connected to the system bus 46 typically via a video adapter 66. Personal computers usually also include other peripheral output devices (not shown), such as speakers and printers connected to appropriate interfaces. It is noted that while the above description refers to a PC, those skilled in the art will appreciate that the invention may be practiced with other software configurable computing systems, including hand-held devices, multiprocessor systems, microprocessor-based or programmable consumer electronics, network PCs, minicomputers, mainframe computers, and the like.

In the context of the present invention, the personal computer 40 would also include a connection to a fax modem 70 via an appropriate interface 80, which is linked to the system bus 46, for establishing communications over phone lines. This fax modem 70 could be internal or external. Additionally, in the context of the present invention, the personal computer would also include a scanner 62 for scanning in images for facsimile transmission.

The server 30 according to the present invention consists of a PC or other computer, or a grouping of computers, similar to that shown in FIG. 2B. The server 30 responds to requests and commands from the transmitting fax device 10. Specifically, the server receives the transmission from the fax device and decodes the data to determine whether or not to forward email or fax messages on to intended recipients, preferably as outlined in the flow diagrams of FIGS. 3 through 8.

Referring again to FIG. 1, the server 30 will typically communicate with the transmitting fax device in accordance with facsimile communications protocol as defined by CCITT (or ITU-T) Group 3 over the PSTN as discussed above. However, other protocols and non-PSTN connections could be employed, when desired. For example, the server 30 could be coupled to the fax device via a LAN, rather than the PSTN. Electronic mail communications are performed between the server 30 and the telephone line 29 by establishing a communications link with router 100 which provides connection to the Internet 200 in order to transmit and receive information between the server 30 and the Internet 200. The router 100 typically transmits and receives electronic mail messages in accordance with the SMTP. The functions performed by the routers 100, 105a and 105b may be performed by a commercial service which provides access to the Internet via dial-up connection. Remote mail servers, as seen at 107a-107b, each implement electronic mailboxes 108a-108b to receive electronic messages.

The configuration of FIG. 1 is merely illustrative of one manner of coupling the server 30 to the remote electronic mailboxes. Connections between the server 30 and the Internet may take several forms. For example, the server 30 may be coupled to the router 100 by way of a LAN, and thus bypass the PSTN. If the PSTN is employed to connect with the router 100, the connection may take one of several forms including dial-up lines or more permanent connections in the form of leased lines.

It is noted in regard to the embodiments of the "fax" employing a PC or the server that no particular program language has been indicated for carrying out the various processes described herein. Each designer will be aware of a language which is most suitable for his or her immediate purposes. In addition, because the computers and other devices which may be used in practicing the instant invention consist of many diverse elements, no detailed program listing has been provided. It is considered that the operations and other procedures described herein and illustrated in the accompanying drawings are sufficiently disclosed to enable one of ordinary skill in the art to practice the instant invention. Further, the invention will be described in the general context of process steps, such as can be embodied in program modules and sub-modules executable by an appropriate computing device. Generally, these program modules and sub-modules include routines, programs, objects, components, data structures, etc. that perform particular tasks or implement particular abstract data types.

Specialized data, which is based on data entered into the sending fax device 10 by the user, is transferred from this device 10 to the server 30 in the fax transmission. In the preferred embodiment, the fax device 10 should be able to support fax BFT capabilities as discussed previously. This capability will allow data identified by tags to be entered into the message that is transmitted from the fax device to the server. Such tags would at a minimum identify an email address or addresses. Additionally, tags could be added to include an identification code for identifying the sending fax device, fax number(s), a reply email address for the sender and/or an indicator as to whether the message data is encrypted or not. The server strips away the tags and associated data, deciphers the tagged data, and forwards the remaining message data to the appropriate fax or email recipients or otherwise acts on the transmission based on the information contained in the tags. However, even if the sending fax device does not support BFT format, the server could employ the use of fax data transmitted in another form to implement the same concept of extracting data from the fax transmission, deciphering it and then forwarding the appropriate emails or faxes to the intended recipient(s) or otherwise acting on the fax transmission. For example, a standard fax device which uses headers might include the above tag data in the form of fields included in the fax header data.

Figure 3:
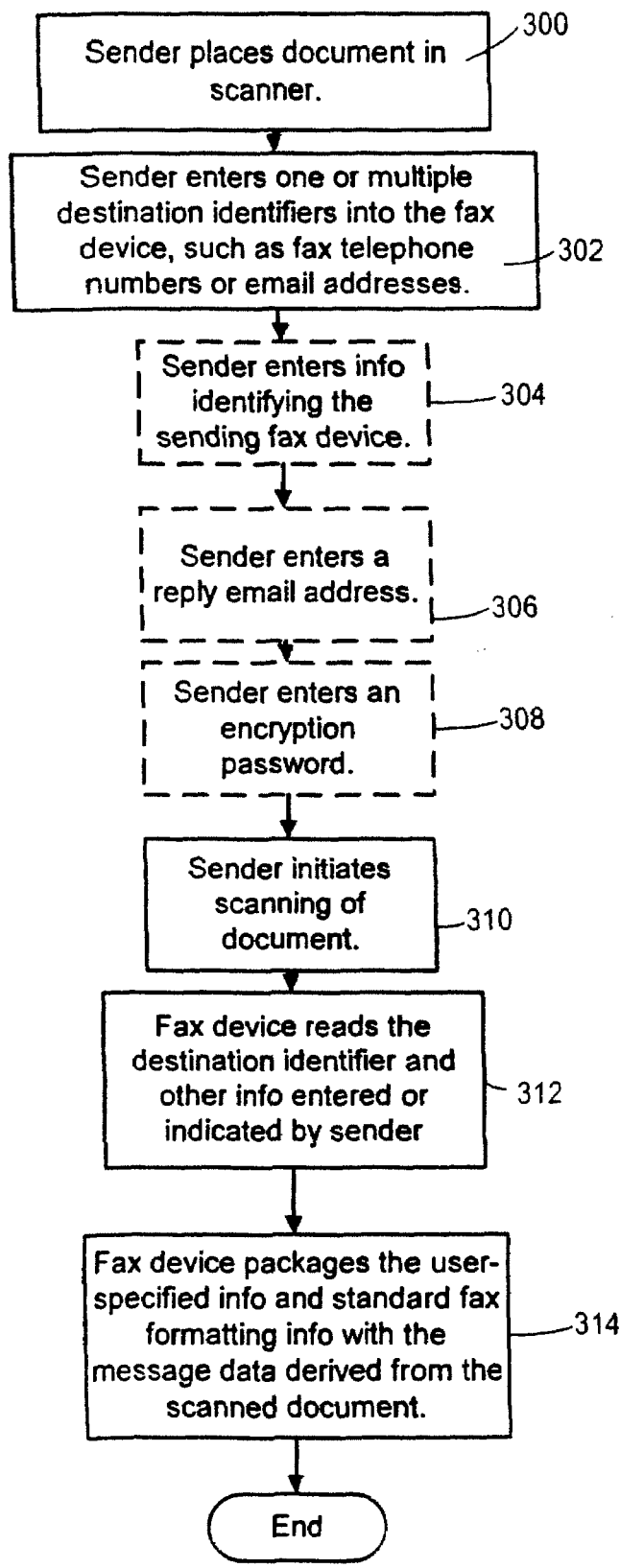
FIG. 3 is a flowchart outlining a process for entering data into a fax device.

FIGS. 3 through 7B present flowcharts outlining the functions performed as part of the present invention to transmit information in accordance with either a fax or email transmission protocol, or both. Although the figure indicates the steps to send the original faxed message to one email recipient, the server could send the same message to numerous email recipients as long as their email addresses were identified in the transmitted messages. As shown in FIG. 3, a user wishing to transmit a document to the server to have it forwarded via fax or email, would place the document in the fax device scanner (step 300) and enter one or multiple destination identifiers into the fax device keyboard (step 302). The destination identifier(s) would either take the form of a phone number, or an email address, or both, depending on where and how the sender wishes the document to go. The email addresses or fax numbers could also have been entered beforehand and stored in a memory location in the memory of the fax device. In such a case the user would select the memory location via a method appropriate to the fax device in order to designate the email addresses or fax numbers contained therein. Alternatively, the server may contain one or more memory locations containing listings of email addresses or fax telephone numbers, such as for example in the form of a mailing list. In such a case, the sending fax device can elect to send emails or faxes to recipients stored in such a server repository. This would be accomplished by providing an indicator in the fax transmission which designates the appropriate memory location for the desired listing resident in the server, rather than or in addition to the aforementioned email addresses or fax numbers.

The sender could also enter other optional information. This information is shown in FIG. 3 in broken line boxes because of its optional nature. For example, if it has not been done previously (and stored in the fax device's memory), the user could enter information identifying the fax device (step 304). As will be described later, this information is used to determine if the sender is authorized to use the server. In addition, it can be incorporated in the email messages or faxes transmitted by the server to identify the sender. The sender could also enter a reply email address associated with the sender (step 306). This information could be used to facilitate return communications from a recipient, as will be explained in more detail later in this description. Another example of information that can be entered by the sender relates to sending encrypted message data to the server for forwarding via email or facsimile. This is accomplished by entering a password (step 308). A preferred embodiment implementing this encryption feature uses the password to cause the fax device to scramble the scanned data for transmission purposes. Preferably this encryption is keyed to the password such that the password dictates the encryption sequence in a manner consistent with currently available encryption programs. The password is not provided in the fax transmission so that even the server cannot "read" the message data. The person receiving the data would already have been given the password needed to decode the email. The recipient would also have a viewer that recognizes the data as scrambled and asks the recipient for the password. Once the password is entered, the former fax is decoded. The advantage of this embodiment is that the data is not decrypted until it reaches the recipient. The password could be a global password that is used for all emails. Or the password could be a specific to a particular email transmission. This specific password would override the general password for that email transmission.

Referring again to FIG. 3, upon pressing a command button of the fax device or in some other way starting the process, the sender causes the fax device to initiate scanning of the document (step 310) and to read the information entered/indicated by the user or stored in fax device's memory (step 312). For example, this process could be initiated by entering the telephone number of the server or selecting the server number from one or more preprogrammed telephone numbers previously stored in the memory of the facsimile device. Next the fax device packages the user-specified and other standard fax formatting data as needed with the message data derived from the scanned document, as is shown in step 314.

Figure 4:
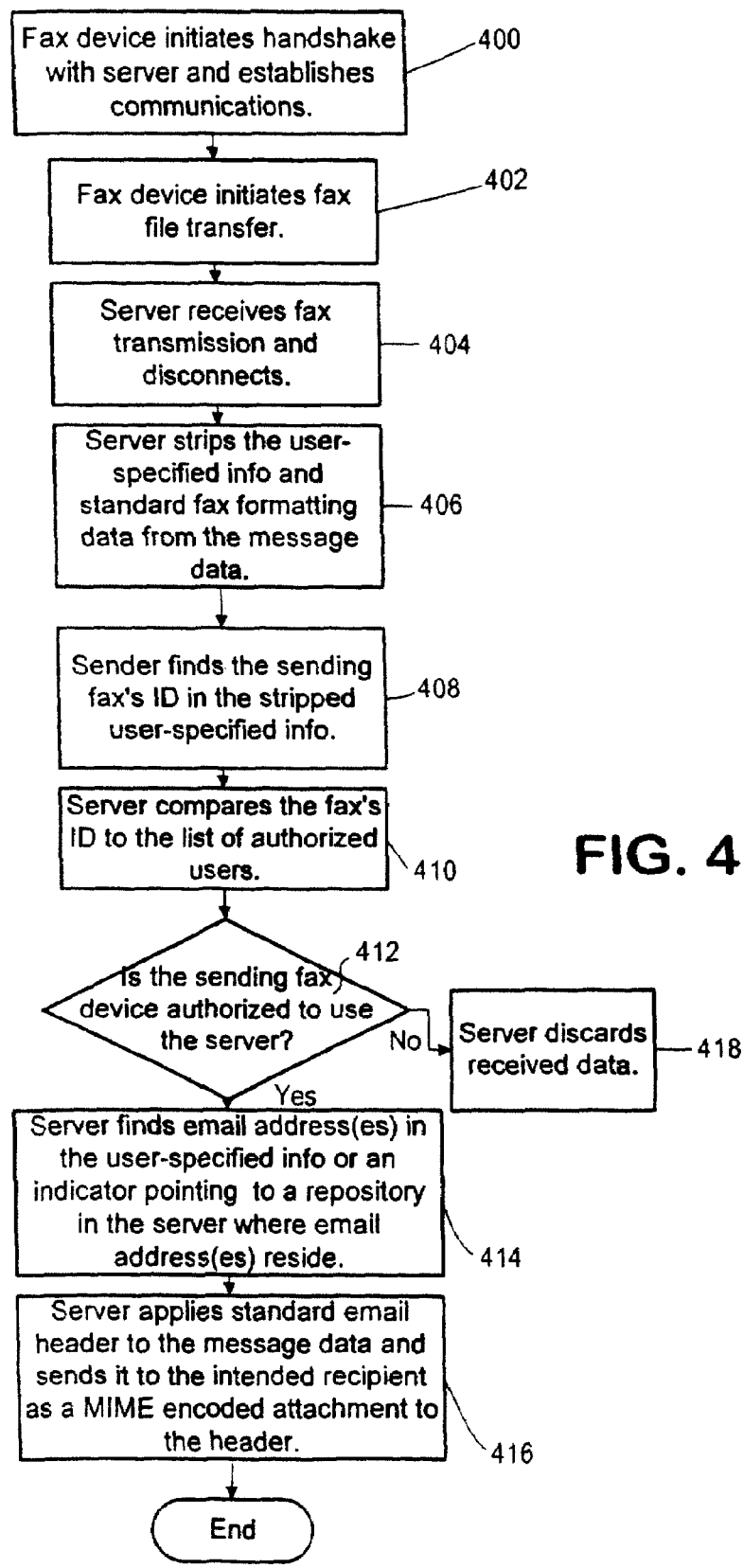
FIG. 4 is a flowchart outlining a process for transferring data from the fax device to the server, the server then forwarding the appropriate data as an email to the intended recipient(s).

Referring now to FIG. 4, the transfer process continues with the fax device initiating a handshake with the server as shown in step 400. Once the fax device and the server have established communications, the fax device initiates a file transfer, preferably a BFT file transfer, of the aforementioned packaged fax data to the server as shown in step 402.

In step 404 the server receives the fax transmission and disconnects its telephone connection to the sending facsimile device. The server then strips the user-specified information and standard fax formatting data from the fax transmission leaving only the message data as shown in step 406. Next, the server can check to ensure the sending fax device is authorized to use the server. This could be assumed because the sending fax device has faxed data to the server. However, it is preferable that the server finds the appropriate tag in the transmitted user-specified information associated with the sending fax's identification (step 408) and then compares this identification information to a listing of authorized users stored in a memory location in the server (step 410). This, of course, assumes the sending fax device has included the device's identification in the transmitted user-specified information. It is then determined if the sending fax device is an authorized user (i.e., it is on the list) in step 412. If the fax device is authorized to use the server, the server finds the destination identifier(s) in the user-specified information (step 414), which can be email addresses or an indicator specifying a repository of email addresses in a memory location of the server. Then, in step 416, the server applies a standard email header to the message data and sends the data to the intended recipient(s) preferably as a MIME encoded attachment to the header. However, if the server determines that the fax device is not authorized to use the server as shown in step 412, the server discards the received data as shown in step 418.

Figure 5:
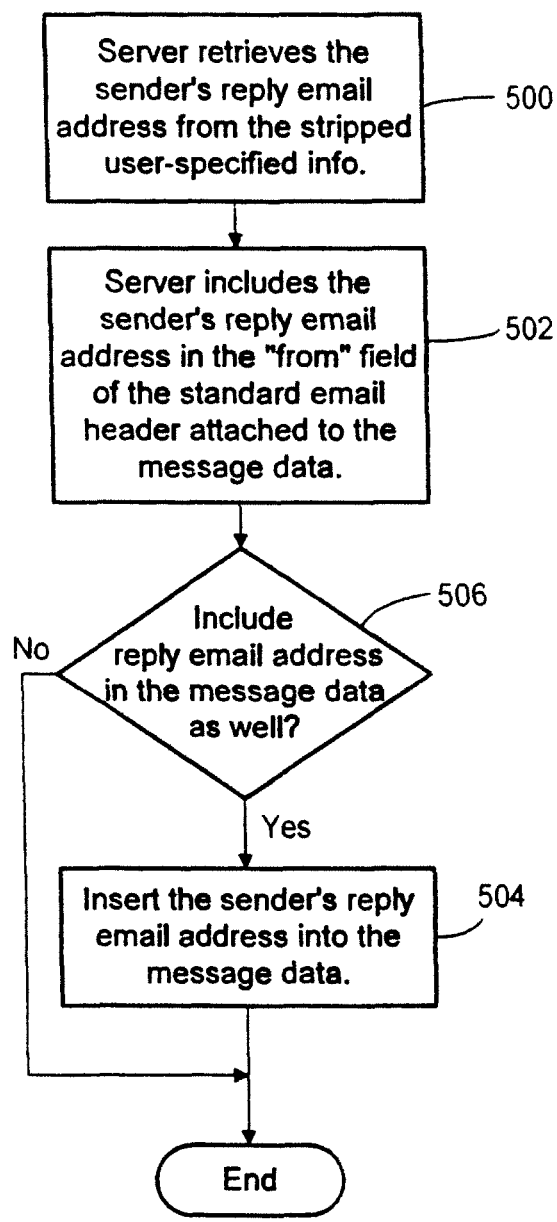
FIG. 5 is a flowchart outlining a process for including the sender's reply email address in the email sent to a recipient.

In conjunction with the server applying the email header to the message data and transmitting the header and data to the recipient (i.e., step 416 of FIG. 4), the server can also provide a reply email address belonging to the sender of the message data, as outlined in FIG. 5. The sender's reply email address is preferably retrieved from the previously stripped user-specified information of the original fax transmission from the sender to the server (step 500). This, of course, assumes the reply address was provided in the user-specified information. To transfer the sender's reply email address to the recipient, it can be included in the "from" field of the standard email header that is attached to the message data (step 502). The sender's reply email address could alternatively be inserted into the message data itself and viewed by the recipient along with the rest of the message data (step 504). Or, if desired, both methods of providing the reply address could be employed (step 506).

Figure 6:
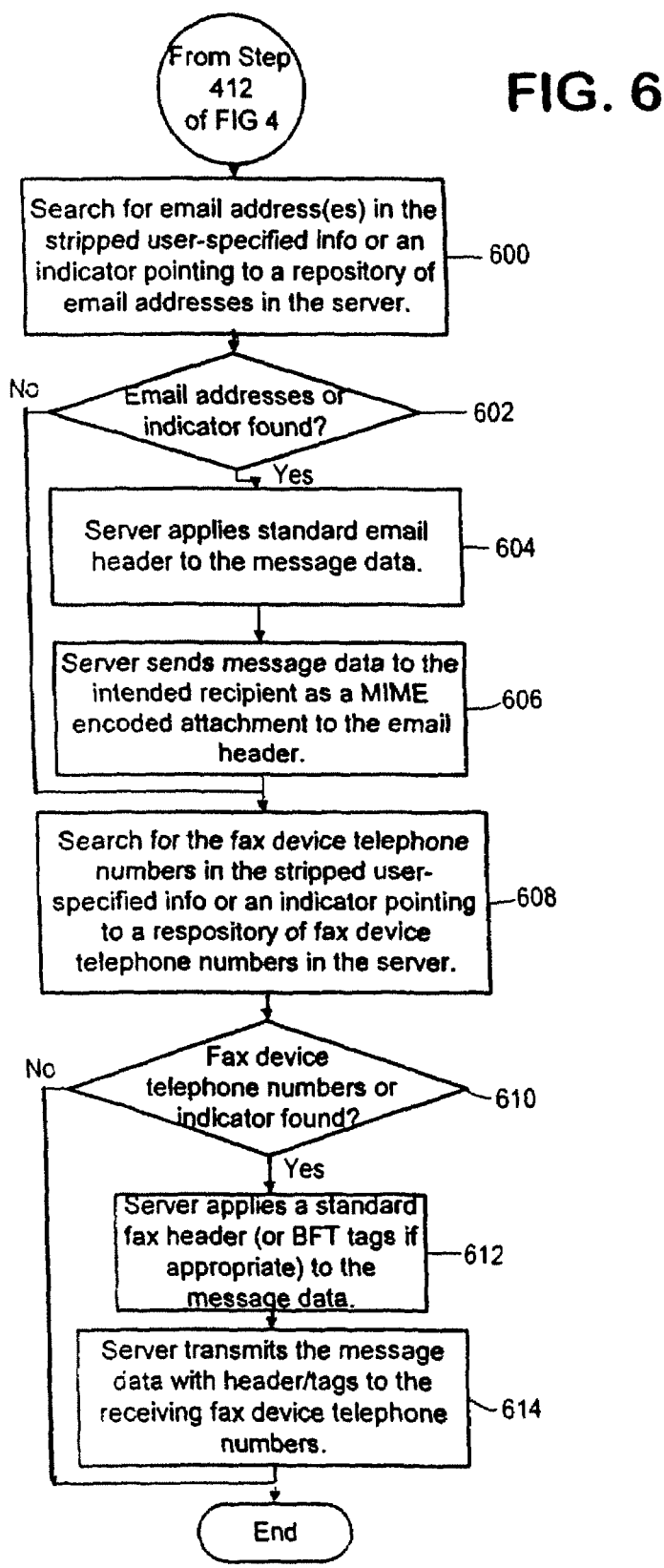
FIG. 6 is a flowchart outlining a process wherein the originally transmitted fax is sent on as a fax, an email, or both, to one or several recipients.

In addition to, or instead of, sending the message data received from a fax device to the email address of a recipient, the server could send the data to other fax devices. This process is outlined in FIG. 6. The initial part of the process is the same as shown in FIG. 4, up to the point where the server determines that the transmitting fax is authorized to use the server (step 412 of FIG. 4). As shown in FIG. 6, the modified process for sending email and/or fax transmissions from the server, begins in step 600 with the server searching for email addresses (or an indicator pointing to a server repository where email addresses reside) in the previously stripped user-specified information. If an email address is found (step 602), the server applies a standard email header to the message data in step 604 and sends the data to the intended recipient preferably as a MIME encoded attachment to the header (step 606). If no email address is found, the server skips steps 604 and 606. Either way, the server then searches for fax device telephone numbers in the stripped user-specified information or an indicator pointing to a fax device telephone number repository in a memory location of the server (step 608). If the server finds fax numbers or the aforementioned indicator (step 610), then it applies a standard fax header or BFT-type tags (as appropriate) to the message data being transmitted (step 612). The server then forwards the message data and header or tags to the receiving fax device(s), as shown in step 614.

Figure 7A:
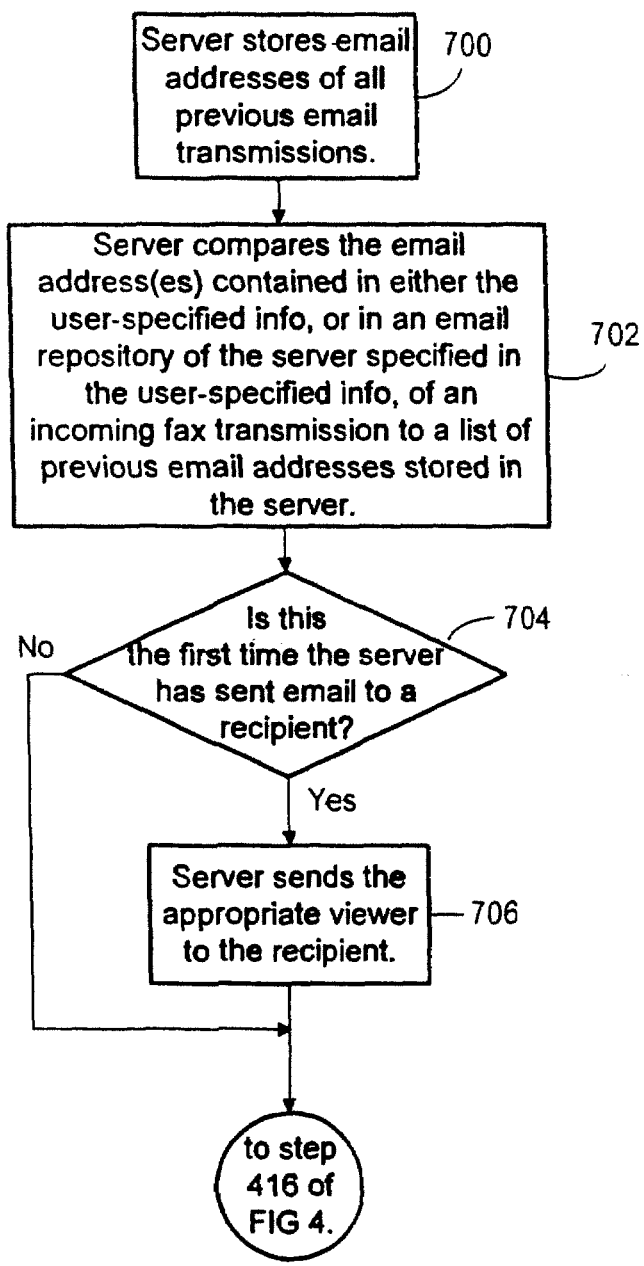
FIG. 7A is a flowchart outlining a process wherein the system sends an appropriate viewer to view the original fax transmission in electronic mail format.

Whenever the message data received from a fax device is sent to the email address of a recipient, it can also be advantageous for the server to determine whether email has ever been sent to the intended recipient before. This is advantageous because, depending on what type of encoding is used for the message data, a decoding viewer may be needed for the recipient to view the data. By sending the appropriate viewer to each first-time email recipient, the server can ensure the email can be viewed. Thus, knowing it email has been sent to a particular recipient before allows the server to determine whether a viewer also needs to be transmitted. To this end, the server stores the addresses of all previous email transmissions in one of its memory locations (step 700), as shown in FIG. 7A. The email address(es) indicated by the user-specified information, or contained in an email address repository of the server identified in the user-specified information, is compared to the list of previous email addresses stored in the server (step 702). If an email address is not found in the list, then the recipient with that address is considered a first-time recipient (step 704). Whenever the server determines a recipient to be a first-time recipient, it sends the appropriate viewer to the recipient (step 706) to ensure the message data can be viewed. There are three preferred ways of accomplishing the transfer of the viewer to the first-time email recipient. The first method involves sending the viewer in a separate email transmission to the recipient. This separate transmission would include a message viewable by the recipient which tells the recipient to save and use the viewer if they cannot open the email. The second preferred way of transmitting the viewer to the recipient is to include it as a second attachment to the initial email transmission to the recipient. Preferably a message viewable by the recipient would be included in the email transmission which instructs the recipient to select and save this second attachment containing the viewer, and to use it to view the message data contained in the first attachment. Finally, the viewer could be inserted into the message data itself, thus making the message data a self-viewing file. Specifically, when the recipient selects the attachment to the email header that contains the message data and the embedded viewer, the viewer executes and allows the recipient to view the message data. It should be noted that in this last method, it would also be preferred that a message be included, for example in the message data, that provides instructions to the recipient for extracting the viewer from the rest of the message data and saving it for future use.

Once the server has transmitted the viewer to a first-time email recipient, it adds the email address to the list of previous email users. However, if the server determines that this is not the first time the server has sent the recipient email, the viewer is not sent. In either case, the message data and its email header are sent to the intended recipient(s) as described above in reference to FIG. 4.

Figure 7B:
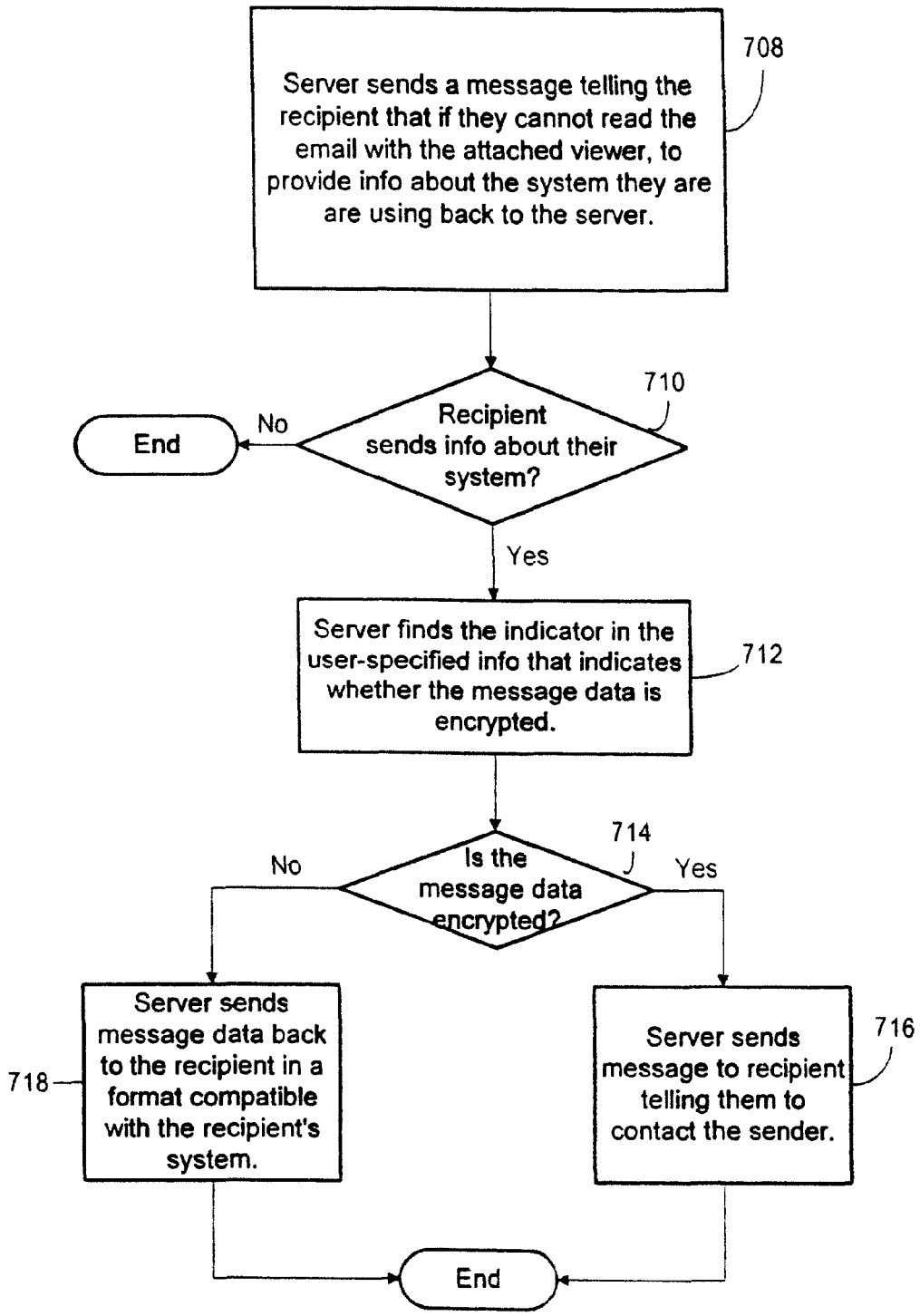
FIG. 7B is a flowchart outlining a process wherein the recipient provides feedback if they cannot read the email they have received from the server.

A variation of the process of FIG. 7A is shown in FIG. 7B. The process is essentially the same, however the server also sends a message telling the recipient that if they cannot read the email with the attached viewer to provide information about the system they are using back to the server (step 708). Preferably, the recipient would provide this information via return email to the server. To this end, the server could include a reply email address belonging to the server in the message. If the recipient sends information about their system (step 710), the server first determines whether the data was encrypted (step 714). This is accomplished by finding the indicator in the user-specified information that indicates whether the message data is encrypted (step 712). If the server determines that the data was encrypted, then the server sends a message to the recipient telling them to contact the original sender (step 716). Preferably, this includes providing the sender's reply email address in the aforementioned message. If desired, the sender's telephone number or other appropriate contact information could be supplied along with or in lieu of the sender's reply email address via the same process. However, in the case where the server determines that the data was not encrypted, then it sends the message data back to the intended recipient in a format compatible with the recipient's system (step 718).

While the invention has been described in detail by specific reference to preferred embodiments thereof, it is understood that variations and modifications thereof may be made without departing from the true spirit and scope of the invention.

What is claimed is:

1. A system for forwarding message data to a recipient, comprising:
   a server to communicate with a facsimile device in accordance with a local area network protocol to receive, by way of a local area network, a request from the facsimile device, wherein the request contains 1) a scanned paper document as message data associated with 2) a recipient's email address specified by a sender and 3) an encryption indicator that indicates whether the message data is encrypted,
   the server is to extract the recipient's email address from the request, apply an email header, to the message data, that contains the extracted recipient's email address, send an email containing the message data with the applied email header, to the recipient's email address,
   the server is to then receive an email message from the recipient that includes information about the recipient's system, check the encryption indicator from the request, and send the message data to the recipient in a format compatible with the recipient's system when determining that the message data is not encrypted and send an email message to the recipient that directs the recipient to contact the sender when determining that the message data is encrypted.

2. The system of claim 1, wherein the server is to include a decoding viewer in an email transmission to the recipient, to facilitate viewing of the message data.

3. The system of claim 2, wherein the server is to send the decoding viewer only if the server determines that the recipient is a first-time recipient.

4. The system of claim 3, further comprising:
   a facsimile device having a keyboard to receive from the sender the recipient's email address, and a scanner to scan a paper document from the sender, the facsimile device to receive a password from the sender, via the keyboard, and to encrypt the scanned document, the facsimile device to receive a transmission command from the sender, via the keyboard, and to transmit the request containing 1) the scanned document as encrypted message data, 2) an encryption indicator that indicates that the message data is encrypted, and 3) the email address of the recipient associated with the scanned document, wherein the encryption is keyed to the password such that the recipient of the encrypted message data can decipher the encrypted message data using the password.

5. The system of claim 2, further comprising:
   a facsimile device having a keyboard to receive from the sender the recipient's email address, and a scanner to scan a paper document from the sender, the facsimile device to receive a password from the sender, via the keyboard, and to encrypt the scanned document, the facsimile device to receive a transmission command from the sender, via the keyboard, and to transmit the request containing 1) the scanned document as encrypted message data, 2) an encryption indicator that indicates that the message data is encrypted, and 3) the email address of the recipient associated with the scanned document, wherein the encryption is keyed to the password such that the recipient of the encrypted message data can decipher the encrypted message data using the password.

6. The system of claim 1, wherein a return email address of the sender is to be inserted into a from-field of an email transmission to the recipient.

7. The system of claim 6, further comprising:
   a facsimile device having a keyboard to receive from the sender the recipient's email address, and a scanner to scan a paper document from the sender, the facsimile device to receive a password from the sender, via the keyboard, and to encrypt the scanned document, the facsimile device to receive a transmission command from the sender, via the keyboard, and to transmit the request containing 1) the scanned document as encrypted message data, 2) an encryption indicator that indicates that the message data is encrypted, and 3) the email address of the recipient associated with the scanned document, wherein the encryption is keyed to the password such that the recipient of the encrypted message data can decipher the encrypted message data using the password.

8. The system of claim 1, further comprising:
   a facsimile device having a keyboard to receive from the sender the recipient's email address, and a scanner to scan a paper document from the sender, the facsimile device to receive a password from the sender, via the keyboard, and to encrypt the scanned document, the facsimile device to receive a transmission command from the sender, via the keyboard, and to transmit the request containing 1) the scanned document as encrypted message data, 2) an encryption indicator that indicates that the message data is encrypted, and 3) the email address of the recipient associated with the scanned document, wherein the encryption is keyed to the password such that the recipient of the encrypted message data can decipher the encrypted message data using the password.

9. A method by a server for forwarding message data to a recipient, the method comprising:
   receiving, by way of a local area network, a request from a facsimile device operated by a sender, wherein the request contains a scanned paper document as message data associated with a recipient's email address and an encryption indicator that indicates whether the message data is encrypted;
   extracting the recipient's email address from the request and applying an email header, to the message data, that contains the extracted recipient's email address;
   sending an email containing the message data with the applied email header to the recipient's email address;
   receiving an email message from the recipient that includes information about the recipient's system;
   checking the encryption indicator from the request to determine whether the message data is encrypted; and
   sending one of 1) the message data to the recipient, via an email message, in a format compatible with the recipient's system when determining that the message data is not encrypted or 2) an email message to the recipient that directs the recipient to contact the sender when determining that the message data is encrypted.

10. The method of claim 9, further comprising:
    including a decoding viewer in an email transmission to the recipient, to facilitate viewing of the message data.

11. The method of claim 10, wherein the decoding viewer is only sent if the server determines that the recipient is a first-time recipient.

12. The method of claim 9, wherein a return email address of the sender is included in a from-field of an email transmission to the recipient.

* * * * *